United States Patent [19]

Lips

[11] Patent Number: 5,793,716
[45] Date of Patent: Aug. 11, 1998

[54] DATE CONVERSIONS WITH A 360-DAY-YEAR CALENDAR

[75] Inventor: Michael D. Lips, San Francisco, Calif.

[73] Assignee: Platinum Technology, Inc., Oakbrook Terrace, Ill.

[21] Appl. No.: 574,744

[22] Filed: Dec. 19, 1995

[51] Int. Cl.$^6$ .......................... G04B 19/24; G06F 15/02
[52] U.S. Cl. .................................. 368/28; 364/705.08
[58] Field of Search ........................ 368/10, 28–30; 364/569, 705.08

[56] References Cited

U.S. PATENT DOCUMENTS

| | | | |
|---|---|---|---|
| 4,274,146 | 6/1981 | Yanagawa | 364/705 |
| 4,573,127 | 2/1986 | Korff | 364/493 |
| 4,852,030 | 7/1989 | Munday | 364/569 |
| 5,023,851 | 6/1991 | Murray et al. | 368/41 |
| 5,568,451 | 10/1996 | Fukutani | 368/10 |

*Primary Examiner*—Vit W. Miska
*Attorney, Agent, or Firm*—Trial & Technology Law Group

[57] ABSTRACT

Conversion of Gregorian calendar dates to dates of a 360-day-year calendar (i.e., a calendar having twelve months of 30 days each), and 360-day-year calendar dates to Gregorian calendar dates, are performed using a single three-column 367-entry conversion table. A search table unit searches the conversion table from the bottom upwards, i.e., a table search index is initialized to a value of 367, and decremented by unity each time a comparison is made and a match is not found. A first field in each row of the conversion table contains Gregorian leap year calendar days-of-the-year, a second field in each row contains Gregorian non-leap year calendar days-of-the-year, and a third field in each row contains 360-day-year calendar days-of-the-year. A graph of Gregorian days-of-the-year versus 360-day-year days-of-the-year has both vertical and horizontal sections. If a conversion from a Gregorian date stored in a month/day character register to a 360-day-year date is to be made, the field to be searched is dependent on the value of a flag is a leap year flag register. If a conversion from a 360-day-year date stored in a 360-day-year character register to a Gregorian date is to be made, after a match between the 360-day-year date and an entry in the third field is found the value of the flag in the leap year flag register determines which field the conversion day-of-the-year is taken from.

8 Claims, 6 Drawing Sheets

DATE CONVERSIONS WITH A 360-DAY-YEAR CALENDAR

BACKGROUND OF THE INVENTION

1. Field of the Invention

The present invention relates to methods and apparatus for 360-day-year calculations, more particularly to such methods and apparatus which allow conversion of all Gregorian and Julian dates to 360-day-year dates and conversion of all 360-day-year dates to Gregorian or Julian dates, and in particular to method and apparatus which utilize a table-lookup to convert between a 360-day-year calendar and Gregorian or Julian calendars.

2. Prior Art

Gregorian dates are based on the Gregorian calendar, where according to the old rhyme, "Thirty days hast September, April, June and November; All the rest have thirty-one; Except for February which has 28 days clear; And 29 in each leap year." A Julian date has a year and a day-of-the-year between 1 and 365. For example, since January has 31 days, the Gregorian date of Feb. 5, 1995 is written in Julian form as 036/1995. Method and apparatus for conversion between Julian and Gregorian calendars are well-known in the art, and any efficient system can be used in conjunction with the calendar conversions of the present invention.

The 360-day-year calendar was developed for financial calculations because of the simplicity of a year where each month has 30 days. For instance, the day-of-the-year which is 46% of a year past March 1 is easily determined by noting that 169.2 is 46% of 360, and since it is easily determined that 169 equals 5×30 plus 19, an increment of 169 days in a 360-day-year is an increment of five months and nineteen days. Therefore, August 20 is 46% of a year past March 1 according to a 360-day-year calculation. Also, many fractional year increments are equal to an integer number of months: one twelfth of a year is one month, one sixth of a year is two months, one fourth of a year is three months, one third of a year is four months, and one half of a year is sixth months. Although this type of simplification is not of as much use in the current age of microelectronics, many financial institutions still use 360-day-year methods for ongoing calculations which were started using a 360-day-year method. Also, 360-day-year methods are implemented in business or legal situations where such methods remain a standard.

Generally, the prior art systems use an algebraic formula for conversion of Gregorian or Julian dates to 360-day-year dates and conversion of 360-day-year dates to Julian or Gregorian dates, but generate dates which do not actually exist or gaps between existing dates. For instance, a pseudocode implementation of an algorithm for conversion of a Gregorian date to a 360-day-year date is:

If (GREGORIAN-DAY-OF-MONTH<30),
    Set 360-DAY=GREGORIAN-DAY-OF-MONTH, Else
    Set 360-DAY=30;

Set 360-DAY=360-DAY+[30×(GREGORIAN-MONTH-1)];

For the year 1996, which is a leap year, this pseudocode generates the conversions from Gregorian dates to 360-day-year dates shown in Table 1 below.

TABLE 1

| Gregorian Date | 360-day-year Date |
|---|---|
| 02/27/1996 | 1996/057 |
| 02/28/1996 | 1996/058 |
| 02/29/1996 | 1996/059 |
| 03/01/1996 | 1996/061 |
| 03/02/1996 | 1996/062 |

It should be noted that according to this conversion, in a leap year there is no 60th day-of-the-year of the 360-day-year. For the year 1994, which is not a leap year, this pseudocode generates the conversions from Gregorian dates to 360-day-year dates shown in Table 2 below.

TABLE 2

| Gregorian Date | 360-day-year Date |
|---|---|
| 02/27/1994 | 1994/057 |
| 02/28/1994 | 1994/058 |
| 03/01/1994 | 1994/061 |
| 03/02/1994 | 1994/062 |

It should be noted that according to this conversion, in a non-leap year there is no 59th day-of-the-year and no 60th day-of-the-year of the 360-day-year.

A pseudocode implementation of an algorithm for conversion of a Julian date to a 360-day-year date is:

If JULIAN-YEAR is a leap year
    Set 360-DAY=Integer(JULIAN-DAY*360/366);
If JULIAN-YEAR is not a leap year
    Set 360-DAY=Integer(JULLIAN-DAY*360/365);

where the function Integer outputs the largest integer less than or equal to the value of the argument. For the year 1996, which is a leap year, this pseudocode generates the conversions from Julian dates to 360-day-year dates shown in Table 3 below.

TABLE 3

| Julian Date | 360-day-year Date |
|---|---|
| 057/1996 | 056/1996 |
| 058/1996 | 057/1996 |
| 059/1996 | 058/1996 |
| 060/1996 | 059/1996 |
| 061/1996 | 060/1996 |
| 062/1996 | 060/1996 |
| 063/1996 | 061/1996 |

It should be noted that according to this conversion, in a leap year there are two 60th days-of-the-year of the 360-day-year. For the year 1994, which is not a leap year, this pseudocode generates the conversions from Julian dates to 360-day-year dates shown in Table 4 below.

TABLE 4

| Julian Date | 360-day-year Date |
|---|---|
| 057/1994 | 056/1994 |
| 058/1994 | 057/1994 |
| 059/1994 | 058/1994 |
| 060/1994 | 059/1994 |
| 061/1994 | 060/1994 |
| 062/1994 | 061/1994 |
| 063/1994 | 062/1994 |

A pseudocode implementation of an algorithm for conversion of a 360-day-year date to a Gregorian date is:

Set GREGORIAN-MONTH=Integer(360-DAY/30)
TEMP=GREGORIAN-MONTH×30;
GREGORIAN-DAY-OF-MONTH=360-DAY−TEMP;
Set GREGORIAN-MONTH=GREGORIAN-MONTH+1;
If GREGORIAN-DAY-OF-MONTH=0
  Then Set GREGORIAN-DAY-OF-MONTH=30
  And Set GREGORIAN-MONTH=GREGORIAN-MONTH−1;
Set GREGORIAN-YEAR =360-DAY-YEAR;
where again the function Integer outputs the largest integer less than or equal to the value of the argument. For the year 1996, which is a leap year, this pseudocode generates the conversions from 360-day-year dates to Gregorian dates shown in Table 5 below.

TABLE 5

| 360-day-year Date | Gregorian Date |
|---|---|
| 057/1996 | 2/27/1996 |
| 058/1996 | 2/28/1996 |
| 059/1996 | 2/29/1996 |
| 060/1996 | 2/30/1996 |
| 061/1996 | 3/01/1996 |
| 062/1996 | 3/02/1996 |

It should be noted that according to this conversion, February has thirty days. For the year 1994, which is not a leap year, this pseudocode generates the conversions from Gregorian dates to 360-day-year dates shown in Table 6 below.

TABLE 6

| 360-day-year Date | Gregorian Date |
|---|---|
| 057/1994 | 2/27/1994 |
| 058/1994 | 2/28/1994 |
| 059/1994 | 2/29/1994 |
| 060/1994 | 2/30/1994 |
| 061/1994 | 3/01/1994 |
| 062/1994 | 3/02/1994 |

Again, according to this conversion February has thirty days.

A pseudocode implementation of an algorithm for conversion of a 360-day-year date to a Julian date is:
If 360-YEAR is a leap year
  Set JULIAN-DAY=Integer(360-DAY*366/360);
If 360-YEAR is not a leap year
  Set JULIAN-DAY=Integer(360-DAY*365/360);
where the function Integer outputs the largest integer less than or equal to the value of the argument. For the year 1996, which is a leap year, this pseudocode generates the conversions from 360-day-year dates to Julian dates shown in Table 7 below.

TABLE 7

| 360-day-year Date | Julian Date |
|---|---|
| 057/1996 | 057/1996 |
| 058/1996 | 058/1996 |
| 059/1996 | 059/1996 |
| 060/1996 | 061/1996 |
| 061/1996 | 062/1996 |
| 062/1996 | 063/1996 |

It should be noted that according to this conversion, in a leap year there is no 60th day-of-the-year of the Julian year. For the year 1994, which is not a leap year, this pseudocode generates the conversions from 360-day-year dates to Julian dates shown in Table 8 below.

TABLE 8

| 360-day-year Date | Julian Date |
|---|---|
| 057/1996 | 057/1996 |
| 058/1996 | 058/1996 |
| 059/1996 | 059/1996 |
| 060/1996 | 060/1996 |
| 061/1996 | 061/1996 |
| 062/1996 | 062/1996 |

These algebraic methods for conversions between calendars present some problems. For instance, converting the 60th day-of-the-year of the 360-day-year calendar during a leap year such as 1996 to the Gregorian calendar (see Table 5) produces the date Feb. 30, 1996. This date does not exist, and inadequate error screening would cause a system failure or a faulty calculation. Similarly, converting the 59th and 60th days-of-the-year of the 360-day-year calendar for 1994, a year which is not a leap year, to the Gregorian calendar (see Table 6) produces the dates Feb. 29, 1994 and Feb. 30, 1994. Neither of these dates exist, and again inadequate error screening would cause a system failure or a faulty calculation.

It should also be noted that in a conversion from a Gregorian day-of-the-year to a 360-day-year day-of-the-year, the 60th day-of-the-year of the 360-day-year does not exist for leap years (see Table 1), and the 59th and 60th days-of-the-year of the 360-day-year do not exist for non-leap years (see Table 2). Since the Gregorian year has 365 days, it is to be expected that the mapping of Gregorian day-of-the-year to 360-day-year days-of-the-year is a many-to-one mapping, and every day-of-the-year of the 360-day-year should be used. Therefore, a mapping of Gregorian days-of-the-year to 360-day-year days-of-the-year which does not use all of the available days in the 360-day-year is clearly not optimal.

Another problem with the algebraic conversion methods is that in converting an initial day-of-the-year from the Julian calendar to the 360-day-year calendar, and then back to the Julian calendar does not necessarily produce the initial day-of-the-year. For instance, the 58th and 63rd days-of-the-year of the Julian calendar of 1996, a year which is a leap year, are converted to the 57th and 61st days-of-the-year of the 360-day-year calendar of 1996 (see Table 3), respectively. However, converting the 57th and 61st days-of-the-year of the 360-day-year calendar of 1996 back to the Julian calendar produces the 57th and 62nd days-of-the-year (see Table 7), respectively. Similarly, the 58th and 63rd days-of-the-year of the Julian calendar of 1994, a year which is not a leap year, are converted to the 57th and 62st days-of-the-year of the 360-day-year calendar of 1994 (see Table 3), respectively. However, converting the 57th and 62st days-of-the-year of the 360-day-year calendar of 1994 to the Julian calendar produces the 57th and 62nd days-of-the-year (see Table 7), respectively. Also, the same sort of problem results in converting a day-of-the-year from the 360-day-year calendar to the Julian calendar, and then back to the 360-day-year calendar.

It is therefore a general object of the present invention to provide apparatus and method for a conversion from Gregorian or Julian day-of-the-year to a 360-day-year day-of-the-year.

It is also a general object of the present invention to provide apparatus and method for a conversion from a 360-day-year day-of-the-year to a Gregorian or Julian day-of-the-year.

Another particular object of the present invention is to provide an apparatus and method for converting dates between the 360-day-year calendar and the Gregorian and Julian calendars such that all converted dates exist.

Another object of the present invention is to provide an apparatus and method for conversions between the 360-day-year calendar and the Gregorian or Julian calendars using a look-up table.

Another object of the present invention is to provide an apparatus and method for conversions from the 360-day-year calendar to the Gregorian leap year calendar and the Gregorian non-leap year calendar, and from the Gregorian leap year calendar and the Gregorian non-leap year calendar to the 360-day-year calendar, using a single table, particularly a single table with three fields.

Further objects and advantages of the present invention will become apparent from a consideration of the drawings and the ensuing detailed description.

The present invention is directed to method and apparatus for converting dates between the 360-day-year calendar and the Gregorian calendar using a single date conversion table having a plurality of rows, with each row having three data fields. The first field stores a Gregorian leap year day-of-the-year, a second field stores a Gregorian non-leap year day-of-the-year, and the third field stores a 360-day-year day-of-the-year. For a conversion from a date of a first calendar to a second calendar, the field corresponding to the first calendar (and if the first calendar is the Gregorian calendar, corresponding to whether the year is a leap year) is searched from the last day-of-the-year towards the first day-of-the-year until a match is found with the day-of-the-year to be converted, and the day-of-the-year in that row in the field corresponding to the second calendar (and if the second calendar is the Gregorian calendar, corresponding to whether the year is a leap year) is the day-of-the-year in the second calendar.

BRIEF DESCRIPTION OF DRAWINGS

The accompanying drawings, which are incorporated in and form a part of the present specification, illustrate embodiments of the invention and, together with the Detailed Description, serve to explain the principles of the invention.

DETAILED DESCRIPTION

Figure 1A:
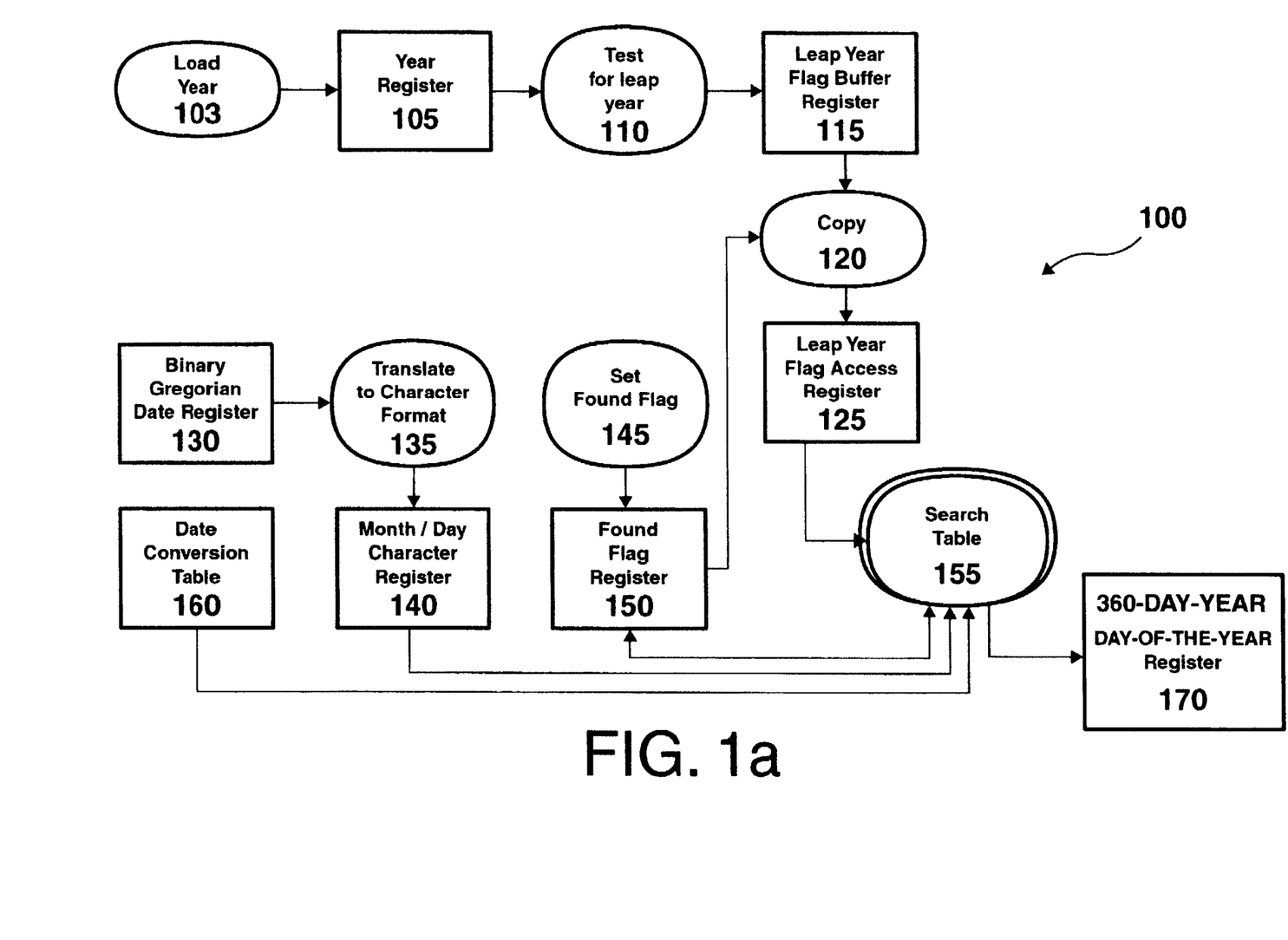
FIG. 1A shows an apparatus for conversion from a Gregorian day-of-the-year to a 360-day-year day-of-the-year.

The system 100 of the present invention for conversion of a Gregorian day-of-the-year to a 360-day-year day-of-the-year is shown in FIG. 1A. (Conversions between the 360-day-year and the Julian calendar are implemented by combining a conversion between the 360-day-year calendar and the Gregorian calendar according to the present invention, with an additional conversion between the Gregorian and Julian calendars according to methods well-known in the art.) The system 100 includes a plurality of storage registers 105, 115, 125, 130, 140, 150, and 170 (shown as rectangular blocks), a plurality of processing units 103, 110, 120, 135, 145, 155 and 165 (shown as oval blocks), and a look-up table 160 (shown as a rectangular block). In the preferred embodiment of the present invention the processing units 103, 110, 120, 135, 145, 155 and 165 are implemented as COBOL computer code. Alternatively, the processing units 103, 110, 120, 135, 145, 155 and 165 may be dedicated hardwired processors. A Search Table unit 155 requires data from a Leap Year Flag Access Register 125, a Month/Day Character Register 140, and a Found Flag Register 150, so these registers 125, 140 and 150 must be loaded with the appropriate values prior to the search performed by the Search Table unit 155. Therefore, the flow chains beginning with a Load Year unit 103, a Binary Gregorian Date Register 130, and a Set Found Flag unit 145 must be completed prior to the operation of the Search Table unit 155. The Search Table unit 155 outputs data to the 360-Day-Year Day-of-the-year Register 170, and back to the Found Flag Register 150. Since the Search Complete unit 165 utilizes the flag value in the Found Flag Register 150, the Search Complete unit 165 operates after the Search Table unit 155 has terminated. (For clarity, the control apparatus for initiating the flow chains is not shown in FIG. 1A.)

To set the flag in the Leap Year Flag Access Register 125 a year is loaded by a Load Year unit 103 into a Year Register 105. This year in the Year Register 105 is accessed by a Test For Leap Year unit 110 which sets a flag in a Leap Year Flag Buffer Register 115 if the year is indeed a leap year. In the preferred embodiment of the present invention, it is determined whether a year is a leap year by calculating the remainders $R(4)$, $R(100)$, $R(400)$ and $R(3200)$ when the year is divided by 4, 100, 400, and 3200, respectively. If $R(4)$ is not zero, the year is not a leap year. If the $R(4)$ is zero, but $R(100)$ is not, the year is a leap year. If $R(100)$ is zero, but $R(400)$ is not, the year is not a leap year. If $R(400)$ is zero, but $R(3200)$ is not, the year is a leap year. And, if $R(3200)$ is zero, the year is not a leap year. The flag in the Leap Year Flag Buffer Register 115 is then copied by a Copy unit 120 to a Leap Year Flag Access Register 125. The Copy unit 120 also functions to prevent the flag in the Leap Year Flag Access Register 125 from changing value if the flag in the Found Flag Register 150 has the "No" value. The flag in the Found Flag Register 150 is set to a "No" value by a Set Found Flag unit 145 at the beginning of the date conversion process, and remains at that value until the date conversion is accomplished.

The Gregorian day-of-the-year is stored in binary form in a Binary Gregorian Date Register 130. Because the Gregorian and 360-day-year days-of-the-year in the Date Conversion Table 160 are stored in character form to facilitate inspection and alterations of the entries in the Date Conversion Table 160, a Translate to Character Format unit 135 is required to convert the Gregorian day-of-the-year to a character format for storage in a Month/Day Character Register 140.

Figure 1B:
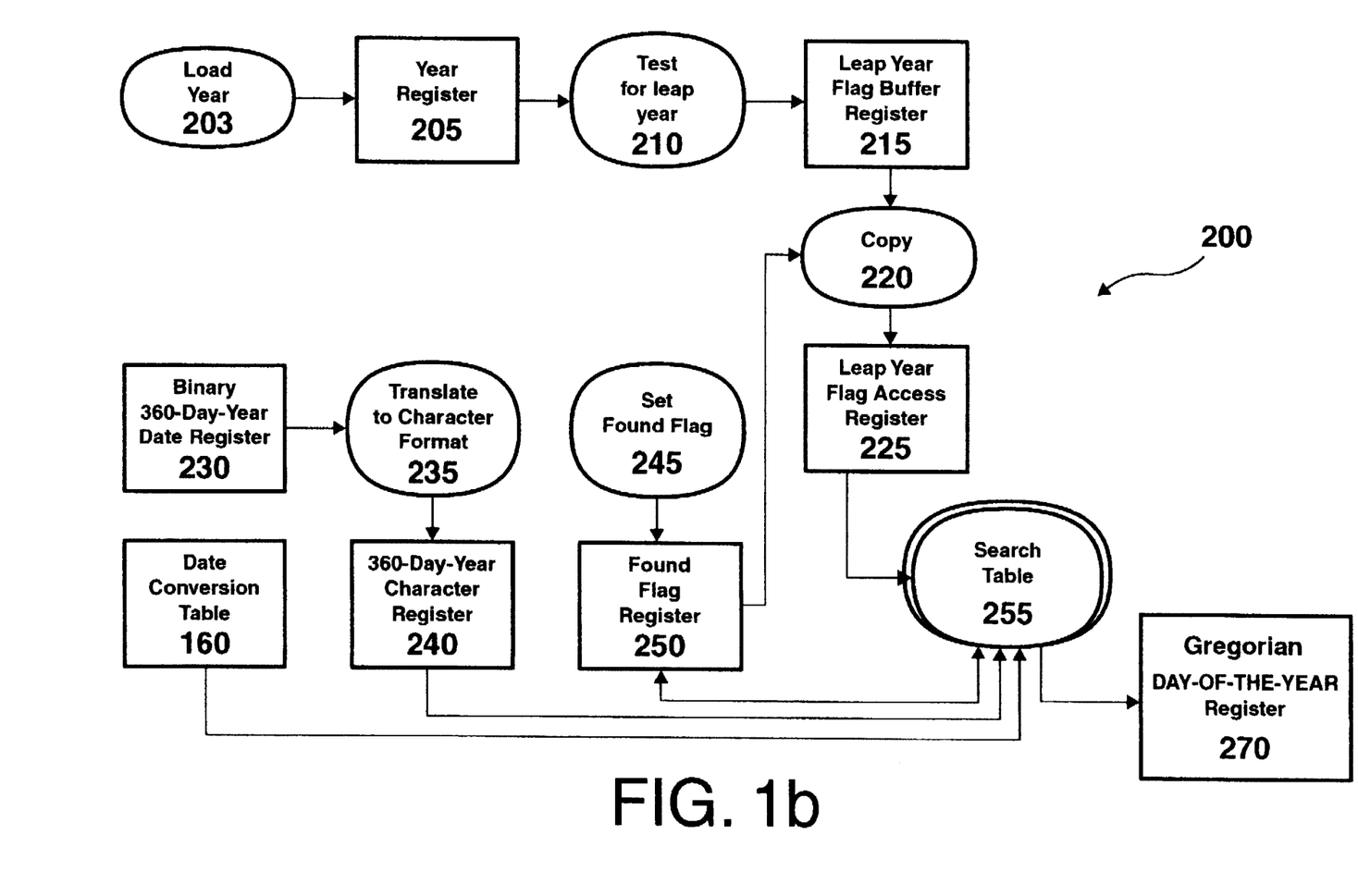
FIG. 1B shows an apparatus for conversion from a 360-day-year day-of-the-year to a Gregorian day-of-the-year.
Figure 1C:
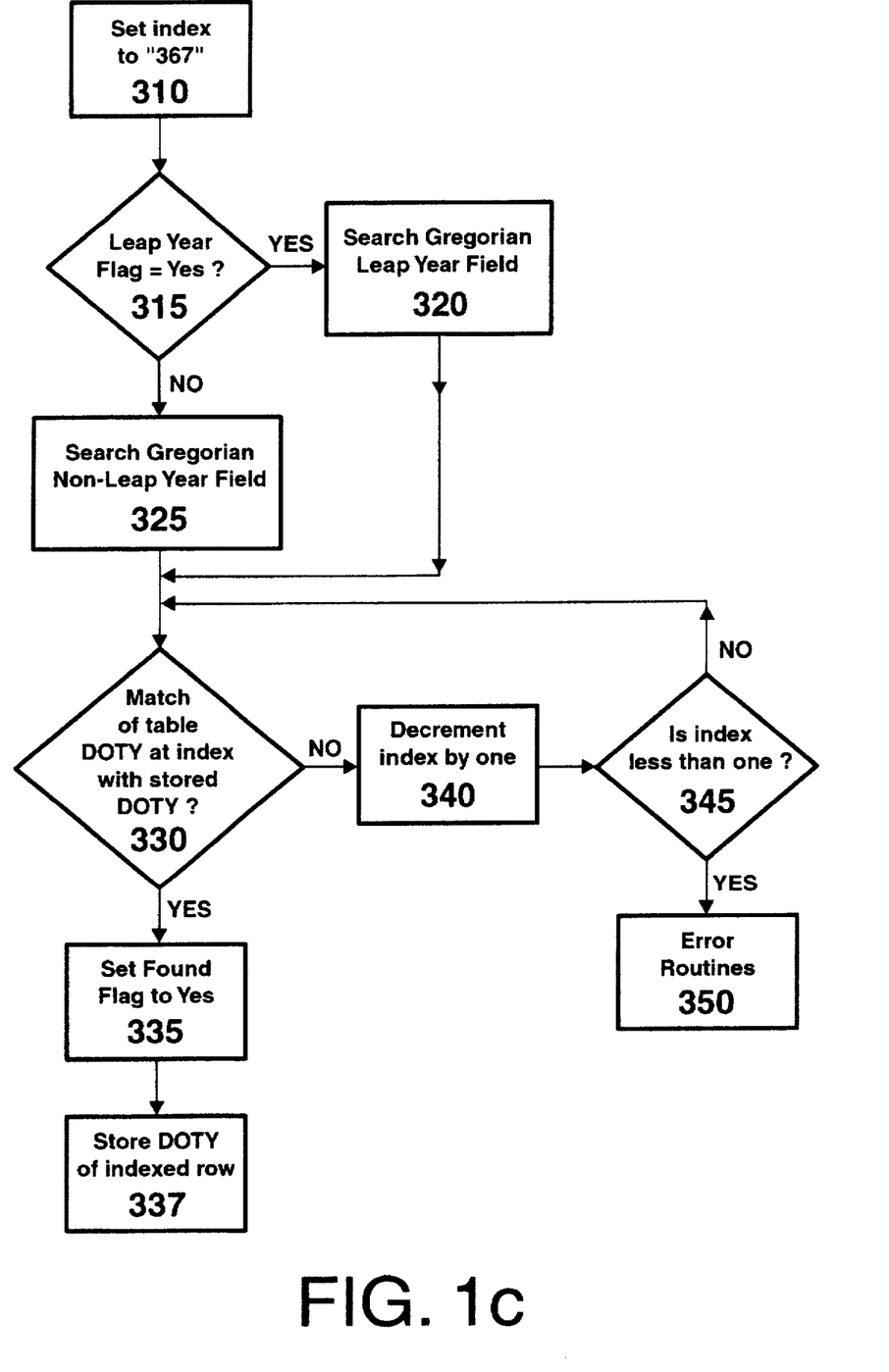
FIG. 1C shows a flow chart for the Search Table unit of FIG. 1A.

A search of days-of-the-year in a Date Conversion Table 160 is performed by the Search Table unit 155 according to the flow chart shown in FIG. 1C. First the index variable is set to an initial value of three hundred and sixty seven 310. Then, the value of the leap year flag in the Leap Year Flag Access Register 125 is evaluated 315. Each row of the Date Conversion Table has three fields: a Gregorian leap year field, a Gregorian non-leap year field, and a 360-day-year field. If the leap year flag has the "Yes" value, then it is determined 320 that the Gregorian leap year field of the Date Conversion Table 160 is to be compared to the Gregorian day-of-the-year in the Month/Day Character Register 140. If the leap year flag has the "No" value, then it is determined 325 that the Gregorian non-leap year field of the Date Conversion Table 160 is to be compared to the Gregorian day-of-the-year in the Month/Day Character Register 140. A comparison is then made 330 between the stored Gregorian day-of-the-year (DOTY) in the Month/Day Character Register 140 and the day-of-the-year (DOTY) at the indexed row of the Date Conversion Table 160 in the appropriate field.

If a match is not found between the stored Gregorian day-of-the-year (DOTY) in the Month/Day Character Register 140 and the DOTY at the indexed row of the Date Conversion Table 160 in the appropriate field, then the index is decremented by one 340. The value of the index is tested 345, and if it is less than one, then the day-of-the-year (DOTY) in the Month/Day Character Register 140 was not found in the Date Conversion Table 160, and error routines 350 are initiated. If the index value is not less than one then another comparison is made 330 between the stored Gregorian day-of-the-year (DOTY) in the Month/Day Character Register 140 and the DOTY at the indexed row of the Date Conversion Table 160 in the appropriate field.

If a match is found during a comparison 330, then the Search Table unit 155 sets the flag in the Found Flag Register 150 to the "Yes" value 335 (enabling the Copy unit 120 to alter the contents of the Leap Year Flag Access Register 125 until another date conversion is begun), and the day-of-the-year (DOTY) at the indexed row in the 360-day-year field is stored 337 in the 360-Day-Year Day-of-the-year Register 170.

The system 200 of the present invention for conversion of a 360-day-year day-of-the-year to a Gregorian day-of-the-year is shown in FIG. 1B. The system 200 includes a plurality of storage registers 205, 215, 225, 240, 250 and 270 (shown as rectangular blocks), a plurality of processing units 203, 210, 220, 230, 235, 245, 255, and 265 (shown as oval blocks), and the look-up table 160 (shown as a rectangular block). In the preferred embodiment of the present invention the processing units 203, 210, 220, 235, 245, 255 and 265 are implemented as COBOL computer code. Alternatively, the processing units 203, 210, 220, 235, 245, 255 and 265 may be dedicated hardwired processors. The Search Table unit 255 requires data from a Leap Year Flag Access Register 225, a 360-day-year Character Register 240, and a Found Flag Register 250, so these registers 225, 240 and 250 must be loaded with the appropriate values prior to the search performed by the Search Table unit 255. Therefore, the flow chains beginning with a Load Year unit 203, a Binary 360-day-year Date Register 230, and a Set Found Flag unit 245 must be completed prior to the operation of the Search Table unit 255. The Search Table unit 255 outputs data to the Gregorian Day-of-the-year Register 270 and back to the Found Flag Register 250. Since the Search Complete unit 265 utilizes the flag value in the Found Flag Register 250, the Search Complete unit 265 operates after the Search Table unit 255 has terminated. (For clarity, the control apparatus for initiating the flow chains is not shown in FIG. 1B.)

To set the flag in the Leap Year Flag Access Register 225 a year is loaded by a Load Year unit 203 into a Year Register 205. This year in the Year Register 205 is accessed by a Test For Leap Year unit 210 which sets a flag in a Leap Year Flag Buffer Register 215 to a "Yes" value if the year is indeed a leap year, and a "No" value otherwise. The flag in the Leap Year Flag Buffer Register 215 is then copied by a Copy unit 220 to a Leap Year Flag Access Register 225. The Copy unit 220 also functions to prevent the flag in the Leap Year Flag Access Register 225 from changing value if the flag in the Found Flag Register 250 has the "No" value. The flag in the Found Flag Register 250 is set to a "No" value by a Set Found Flag unit 245 at the beginning of the date conversion process, and remains at that value until the date conversion is accomplished.

The 360-day-year day-of-the-year is stored in binary form in a Binary 360-Day-Year Date Register 230. The Gregorian and 360-day-year days-of-the-year in the Date Conversion Table 160 are stored in character form to facilitate inspection and alterations of the entries in the Date Conversion Table 160, so a Translate to Character Format unit 235 is required to convert the 360-day-year day-of-the-year to a character format for storage in a 360-Day-Year Character Register 240.

Figure 1D:
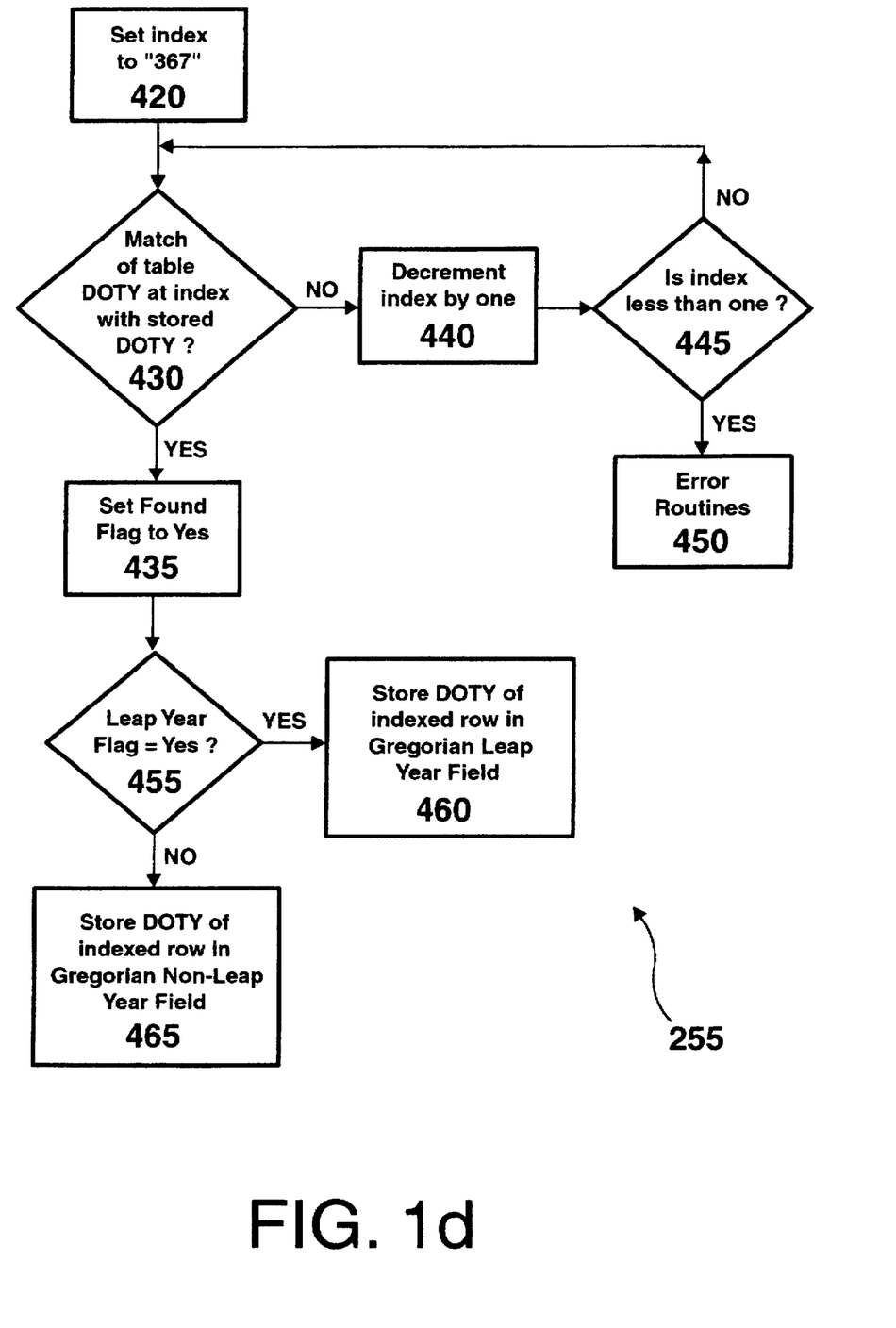
FIG. 1D shows a flow chart for the Search Table unit of FIG. 1B.

A search of days-of-the-year in a Date Conversion Table 160 is performed by the Search Table unit 255 according to the flow chart shown in FIG. 1D. First the index variable is set to an initial value of three hundred and sixty seven 420. A comparison 430 is then made between the stored 360-day-year day-of-the-year (DOTY) in the 360-Day-Year Character Register 240 and the 360-day-year day-of-the-year (DOTY) at the indexed row of the Date Conversion Table 160 in the 360-day-year field.

If a match is not found between the stored 360-day-year day-of-the-year (DOTY) in the 360-Day-Year Character Register 240 and the DOTY at the indexed row of the Date Conversion Table 160 in the 360-day-year field, then the index is decremented by one 440. The value of the index is then tested 445, and if it is less than one, then the day-of-the-year in the 360-Day-Year Character Register 240 was not found in the Date Conversion Table 160, and error routines 450 are initiated. If the index value is not less than one then another comparison is made 430 between the stored 360-day-year day-of-the-year (DOTY) in the 360-Day-Year Character Register 240 and the DOTY at the indexed row of the Date Conversion Table 160.

If a match is found during a comparison 430, then the Search Table unit 255 sets the flag in the Found Flag Register 250 to the "Yes" value 435 (enabling the Copy unit 220 to alter the contents of the Leap Year Flag Access Register 225 until another date conversion is begun). Then it is determined 455 whether the flag in the Leap Year Flag Access Register 225 has the "Yes" value, and if it does then the day-of-the-year (DOTY) at the indexed row in the Gregorian leap year field of the Date Conversion Table 160 is stored 460 in the Gregorian Day-of-the-year Register 270. However, if the flag in the Leap Year Flag Access Register 225 has the "No" value, then the day-of-the-year (DOTY) at the indexed row in the Gregorian non-leap year field of the Date Conversion Table 160 is stored 465 in the Gregorian Day-of-the-year Register 270.

Although the processing units and storage registers in FIG. 1A have different reference numerals than the processing units and storage registers in FIG. 1B, a number of the processing units and storage registers used in the conversion from a 360-day-year day-of-the-year to a Gregorian day-of-the-year diagramed in FIG. 1A could also be used in the conversion from a Gregorian day-of-the-year to a 360-day-year day-of-the-year diagramed in FIG. 1B. In particular, the Load Year unit 103, the Year Register 105, the Test For Leap Year unit 110, the Leap Year Flag Buffer Register 115, the Copy unit 120, the Leap Year Flag Access Register 125, the Set Found Flag unit 145, and the Found Flag Register 150 of FIG. 1A could be used for the Load Year unit 203, the Year Register 205, the Test For Leap Year unit 210, the Leap Year Flag Buffer Register 215, the Copy unit 220, the Leap Year Flag Access Register 225, the Set Found Flag unit 245, and the Found Flag Register 250 of FIG. 1B, respectively. Although the Binary Gregorian Date Register 130, the Month/Day Character Register 140 and the 360-Day-Year Day-of-the-year Register 170 of FIG. 1A could also be used for the Binary 360-Day-Year Date Register 230, the 360-Day-Year Character Register 240, and the Gregorian Day-of-the-year Register 270 of FIG. 1B, respectively, it is preferable to use a different set of registers since the format of the data differs for the different directions of the date conversion. The Translate To Character Format unit 135 and the Search Table unit 155 of FIG. 1A use a different set of processes than the Translate To Character Format unit 235 and the Search Table unit 255 of FIG. 1B, so the same units cannot be used for both directions of the date conversion.

It should be noted that the same date conversion table 160 is used in both the Gregorian to 360-day-year conversions of FIG. 1A and the 360-day-year to Gregorian conversions of FIG. 1B. The fact that a single table with a Gregorian non-leap year field, a Gregorian leap year field and a 360-day-year field (rather than separate two-field tables for the Gregorian leap year to 360-day-year conversion, the Gregorian non-leap year to 360-day-year conversion, the 360-day-year to Gregorian leap year conversion, and the 360-day-year to Gregorian non-leap year conversion) can be used for both direction of date conversion is an important and advantageous innovation of the present invention.

TABLE A provides COBOL computer code for the calendar conversion table of the present invention. The first line of the COBOL computer code describing the table is assigned a level of 01 (as indicated by the "01" at the beginning of the line) and indicates that the name of the table is TCR-CAL-TO-KAL-TABLE. The second line of the COBOL computer code describing the table is assigned a level of 05, and indicates that the entries in the table are assigned to a variable called TRC-CAL-TO-KAL-TABLE-1-DEF. The next three hundred and sixty seven lines of COBOL computer code are at level 10. Each of these three hundred and sixty seven lines specifies an entry of a row of the table TCR-CAL-TO-KAL-TABLE. The second column of each of the table entries contains the dummy name "FILLER." The third and fourth columns of each table entry contains the code "PIC X(17)" to indicate that the entry in each row is seventeen alphanumeric characters long. The fifth column contains the code "VALUE" to indicate that the next column, i.e., the sixth column provides the value of the table entry. The table entries in the sixth column are enclosed in quotes.

TABLE A

```
01  TRC-CAL-TO-KAL-TABLE.
    05  TRC-CAL-TO-KAL-TABLE-1-DEF
        10  FILLER PIC X(17) VALUE    "01/01; 01/01; 001".
        10  FILLER PIC X(17) VALUE    "01/02; 01/02; 002".
        10  FILLER PIC X(17) VALUE    "01/03; 01/03; 003".
        10  FILLER PIC X(17) VALUE    "01/04; 01/04; 004".
        10  FILLER PIC X(17) VALUE    "01/05; 01/05; 005".
        10  FILLER PIC X(17) VALUE    "01/06; 01/06; 006".
        10  FILLER PIC X(17) VALUE    "01/07; 01/07; 007".
        10  FILLER PIC X(17) VALUE    "01/08; 01/08; 008".
        10  FILLER PIC X(17) VALUE    "01/09; 01/09; 009".
        10  FILLER PIC X(17) VALUE    "01/10; 01/10; 010".
```

TABLE A-continued

```
        10  FILLER PIC X(17) VALUE    "01/11; 01/11; 011".
        10  FILLER PIC X(17) VALUE    "01/12; 01/12; 012".
        10  FILLER PIC X(17) VALUE    "01/13; 01/13; 013".
        10  FILLER PIC X(17) VALUE    "01/14; 01/14; 014".
        10  FILLER PIC X(17) VALUE    "01/15; 01/15; 015".
        10  FILLER PIC X(17) VALUE    "01/16; 01/16; 016".
        10  FILLER PIC X(17) VALUE    "01/17; 01/17; 017".
        10  FILLER PIC X(17) VALUE    "01/18; 01/18; 018".
        10  FILLER PIC X(17) VALUE    "01/19; 01/19; 019".
        10  FILLER PIC X(17) VALUE    "01/20; 01/20; 020".
        10  FILLER PIC X(17) VALUE    "01/21; 01/21; 021".
        10  FILLER PIC X(17) VALUE    "01/22; 01/22; 022".
        10  FILLER PIC X(17) VALUE    "01/23; 01/23; 023".
        10  FILLER PIC X(17) VALUE    "01/24; 01/24; 024".
        10  FILLER PIC X(17) VALUE    "01/25; 01/25; 025".
        10  FILLER PIC X(17) VALUE    "01/26; 01/26; 026".
        10  FILLER PIC X(17) VALUE    "01/27; 01/27; 027".
        10  FILLER PIC X(17) VALUE    "01/28; 01/28; 028".
        10  FILLER PIC X(17) VALUE    "01/29; 01/29; 029".
        10  FILLER PIC X(17) VALUE    "01/30; 01/30; 030".
        10  FILLER PIC X(17) VALUE    "01/31; 01/31; 031".
        10  FILLER PIC X(17) VALUE    "02/01; 02/01; 032".
        10  FILLER PIC X(17) VALUE    "02/02; 02/02; 033".
        10  FILLER PIC X(17) VALUE    "02/03; 02/03; 034".
        10  FILLER PIC X(17) VALUE    "02/04; 02/04; 035".
        10  FILLER PIC X(17) VALUE    "02/05; 02/05; 036".
        10  FILLER PIC X(17) VALUE    "02/06; 02/06; 037".
        10  FILLER PIC X(17) VALUE    "02/07; 02/07; 038".
        10  FILLER PIC X(17) VALUE    "02/08; 02/08; 039".
        10  FILLER PIC X(17) VALUE    "02/09; 02/09; 040".
        10  FILLER PIC X(17) VALUE    "02/10; 02/10; 041".
        10  FILLER PIC X(17) VALUE    "02/11; 02/11; 042".
        10  FILLER PIC X(17) VALUE    "02/12; 02/12; 043".
        10  FILLER PIC X(17) VALUE    "02/13; 02/13; 044".
        10  FILLER PIC X(17) VALUE    "02/14; 02/14; 045".
        10  FILLER PIC X(17) VALUE    "02/15; 02/15; 046".
        10  FILLER PIC X(17) VALUE    "02/16; 02/16; 047".
        10  FILLER PIC X(17) VALUE    "02/17; 02/17; 048".
        10  FILLER PIC X(17) VALUE    "02/18; 02/18; 049".
        10  FILLER PIC X(17) VALUE    "02/19; 02/19; 050".
        10  FILLER PIC X(17) VALUE    "02/20; 02/20; 051".
        10  FILLER PIC X(17) VALUE    "02/21; 02/21; 052".
        10  FILLER PIC X(17) VALUE    "02/22; 02/22; 053".
        10  FILLER PIC X(17) VALUE    "02/23; 02/23; 054".
        10  FILLER PIC X(17) VALUE    "02/24; 02/24; 055".
        10  FILLER PIC X(17) VALUE    "02/25; 02/25; 056".
        10  FILLER PIC X(17) VALUE    "02/26; 02/26; 057".
        10  FILLER PIC X(17) VALUE    "02/27; 02/27; 058".
        10  FILLER PIC X(17) VALUE    "02/28; 02/28; 059".
        10  FILLER PIC X(17) VALUE    "03/01; 03/01; 060".
        10  FILLER PIC X(17) VALUE    "03/02; 03/02; 061".
        10  FILLER PIC X(17) VALUE    "03/03; 03/03; 062".
        10  FILLER PIC X(17) VALUE    "03/04; 03/04; 063".
        10  FILLER PIC X(17) VALUE    "03/05; 03/05; 064".
        10  FILLER PIC X(17) VALUE    "03/06; 03/06; 065".
        10  FILLER PIC X(17) VALUE    "03/07; 03/07; 066".
        10  FILLER PIC X(17) VALUE    "03/08; 03/08; 067".
        10  FILLER PIC X(17) VALUE    "03/09; 03/09; 068".
        10  FILLER PIC X(17) VALUE    "03/10; 03/10; 069".
        10  FILLER PIC X(17) VALUE    "03/11; 03/11; 070".
        10  FILLER PIC X(17) VALUE    "03/12; 03/12; 071".
        10  FILLER PIC X(17) VALUE    "03/13; 03/13; 072".
        10  FILLER PIC X(17) VALUE    "03/14; 03/14; 073".
        10  FILLER PIC X(17) VALUE    "03/15; 03/15; 074".
        10  FILLER PIC X(17) VALUE    "03/16; 03/16; 075".
        10  FILLER PIC X(17) VALUE    "03/17; 03/17; 076".
        10  FILLER PIC X(17) VALUE    "03/18; 03/18; 077".
        10  FILLER PIC X(17) VALUE    "03/19; 03/19; 078".
        10  FILLER PIC X(17) VALUE    "03/20; 03/20; 079".
        10  FILLER PIC X(17) VALUE    "03/21; 03/21; 080".
        10  FILLER PIC X(17) VALUE    "03/22; 03/22; 081".
        10  FILLER PIC X(17) VALUE    "03/23; 03/23; 082".
        10  FILLER PIC X(17) VALUE    "03/24; 03/24; 083".
        10  FILLER PIC X(17) VALUE    "03/25; 03/25; 084".
        10  FILLER PIC X(17) VALUE    "03/26; 03/26; 085".
        10  FILLER PIC X(17) VALUE    "03/27; 03/27; 086".
        10  FILLER PIC X(17) VALUE    "03/28; 03/28; 087".
        10  FILLER PIC X(17) VALUE    "03/29; 03/29; 088".
        10  FILLER PIC X(17) VALUE    "03/30; 03/30; 089".
```

TABLE A-continued

| | | | |
|---|---|---|---|
| 10 | FILLER PIC X(17) VALUE | "03/31; 03/31; 090". |
| 10 | FILLER PIC X(17) VALUE | "04/01; 04/01; 091". |
| 10 | FILLER PIC X(17) VALUE | "04/02; 04/02; 092". |
| 10 | FILLER PIC X(17) VALUE | "04/03; 04/03; 093". |
| 10 | FILLER PIC X(17) VALUE | "04/04; 04/04; 094". |
| 10 | FILLER PIC X(17) VALUE | "04/05; 04/05; 095". |
| 10 | FILLER PIC X(17) VALUE | "04/06; 04/06; 096". |
| 10 | FILLER PIC X(17) VALUE | "04/07; 04/07; 097". |
| 10 | FILLER PIC X(17) VALUE | "04/08; 04/08; 098". |
| 10 | FILLER PIC X(17) VALUE | "04/09; 04/09; 099". |
| 10 | FILLER PIC X(17) VALUE | "04/10; 04/10; 100". |
| 10 | FILLER PIC X(17) VALUE | "04/11; 04/11; 101". |
| 10 | FILLER PIC X(17) VALUE | "04/12; 04/12; 102". |
| 10 | FILLER PIC X(17) VALUE | "04/13; 04/13; 103". |
| 10 | FILLER PIC X(17) VALUE | "04/14; 04/14; 104". |
| 10 | FILLER PIC X(17) VALUE | "04/15; 04/15; 105". |
| 10 | FILLER PIC X(17) VALUE | "04/16; 04/16; 106". |
| 10 | FILLER PIC X(17) VALUE | "04/17; 04/17; 107". |
| 10 | FILLER PIC X(17) VALUE | "04/18; 04/18; 108". |
| 10 | FILLER PIC X(17) VALUE | "04/19; 04/19; 109". |
| 10 | FILLER PIC X(17) VALUE | "04/20; 04/20; 110". |
| 10 | FILLER PIC X(17) VALUE | "04/21; 04/21; 111". |
| 10 | FILLER PIC X(17) VALUE | "04/22; 04/22; 112". |
| 10 | FILLER PIC X(17) VALUE | "04/23; 04/23; 113". |
| 10 | FILLER PIC X(17) VALUE | "04/24; 04/24; 114". |
| 10 | FILLER PIC X(17) VALUE | "04/25; 04/25; 115". |
| 10 | FILLER PIC X(17) VALUE | "04/26; 04/26; 116". |
| 10 | FILLER PIC X(17) VALUE | "04/27; 04/27; 117". |
| 10 | FILLER PIC X(17) VALUE | "04/28; 04/28; 118". |
| 10 | FILLER PIC X(17) VALUE | "04/29; 04/29; 119". |
| 10 | FILLER PIC X(17) VALUE | "04/30; 04/30; 120". |
| 10 | FILLER PIC X(17) VALUE | "05/01; 05/01; 121". |
| 10 | FILLER PIC X(17) VALUE | "05/02; 05/02; 122". |
| 10 | FILLER PIC X(17) VALUE | "05/03; 05/03; 123". |
| 10 | FILLER PIC X(17) VALUE | "05/04; 05/04; 124". |
| 10 | FILLER PIC X(17) VALUE | "05/05; 05/05; 125". |
| 10 | FILLER PIC X(17) VALUE | "05/06; 05/06; 126". |
| 10 | FILLER PIC X(17) VALUE | "05/07; 05/07; 127". |
| 10 | FILLER PIC X(17) VALUE | "05/08; 05/08; 128". |
| 10 | FILLER PIC X(17) VALUE | "05/09; 05/09; 129". |
| 10 | FILLER PIC X(17) VALUE | "05/10; 05/10; 130". |
| 10 | FILLER PIC X(17) VALUE | "05/11; 05/11; 131". |
| 10 | FILLER PIC X(17) VALUE | "05/12; 05/12; 132". |
| 10 | FILLER PIC X(17) VALUE | "05/13; 05/13; 133". |
| 10 | FILLER PIC X(17) VALUE | "05/14; 05/14; 134". |
| 10 | FILLER PIC X(17) VALUE | "05/15; 05/15; 135". |
| 10 | FILLER PIC X(17) VALUE | "05/16; 05/16; 136". |
| 10 | FILLER PIC X(17) VALUE | "05/17; 05/17; 137". |
| 10 | FILLER PIC X(17) VALUE | "05/18; 05/18; 138". |
| 10 | FILLER PIC X(17) VALUE | "05/19; 05/19; 139". |
| 10 | FILLER PIC X(17) VALUE | "05/20; 05/20; 140". |
| 10 | FILLER PIC X(17) VALUE | "05/21; 05/21; 141". |
| 10 | FILLER PIC X(17) VALUE | "05/22; 05/22; 142". |
| 10 | FILLER PIC X(17) VALUE | "05/23; 05/23; 143". |
| 10 | FILLER PIC X(17) VALUE | "05/24; 05/24; 144". |
| 10 | FILLER PIC X(17) VALUE | "05/25; 05/25; 145". |
| 10 | FILLER PIC X(17) VALUE | "05/26; 05/26; 146". |
| 10 | FILLER PIC X(17) VALUE | "05/27; 05/27; 147". |
| 10 | FILLER PIC X(17) VALUE | "05/28; 05/28; 148". |
| 10 | FILLER PIC X(17) VALUE | "05/29; 05/29; 149". |
| 10 | FILLER PIC X(17) VALUE | "05/30; 05/30; 150". |
| 10 | FILLER PIC X(17) VALUE | "05/31; 05/31; 151". |
| 10 | FILLER PIC X(17) VALUE | "06/01; 06/01; 152". |
| 10 | FILLER PIC X(17) VALUE | "06/02; 06/02; 153". |
| 10 | FILLER PIC X(17) VALUE | "06/03; 06/03; 154". |
| 10 | FILLER PIC X(17) VALUE | "06/04; 06/04; 155". |
| 10 | FILLER PIC X(17) VALUE | "06/05; 06/05; 156". |
| 10 | FILLER PIC X(17) VALUE | "06/06; 06/06; 157". |
| 10 | FILLER PIC X(17) VALUE | "06/07; 06/07; 158". |
| 10 | FILLER PIC X(17) VALUE | "06/08; 06/08; 159". |
| 10 | FILLER PIC X(17) VALUE | "06/09; 06/09; 160". |
| 10 | FILLER PIC X(17) VALUE | "06/10; 06/10; 161". |
| 10 | FILLER PIC X(17) VALUE | "06/11; 06/11; 162". |
| 10 | FILLER PIC X(17) VALUE | "06/12; 06/12; 163". |
| 10 | FILLER PIC X(17) VALUE | "06/13; 06/13; 164". |
| 10 | FILLER PIC X(17) VALUE | "06/14; 06/14; 165". |
| 10 | FILLER PIC X(17) VALUE | "06/15; 06/15; 166". |
| 10 | FILLER PIC X(17) VALUE | "06/16; 06/16; 167". |
| 10 | FILLER PIC X(17) VALUE | "06/17; 06/17; 168". |
| 10 | FILLER PIC X(17) VALUE | "06/18; 06/18; 169". |
| 10 | FILLER PIC X(17) VALUE | "06/19; 06/19; 170". |
| 10 | FILLER PIC X(17) VALUE | "06/20; 06/20; 171". |
| 10 | FILLER PIC X(17) VALUE | "06/21; 06/21; 172". |
| 10 | FILLER PIC X(17) VALUE | "06/22; 06/22; 173". |
| 10 | FILLER PIC X(17) VALUE | "06/23; 06/23; 174". |
| 10 | FILLER PIC X(17) VALUE | "06/24; 06/24; 175". |
| 10 | FILLER PIC X(17) VALUE | "06/25; 06/25; 176". |
| 10 | FILLER PIC X(17) VALUE | "06/26; 06/26; 177". |
| 10 | FILLER PIC X(17) VALUE | "06/27; 06/27; 178". |
| 10 | FILLER PIC X(17) VALUE | "06/28; 06/28; 179". |
| 10 | FILLER PIC X(17) VALUE | "06/29; 06/29; 180". |
| 10 | FILLER PIC X(17) VALUE | "06/30; 06/30; 181". |
| 10 | FILLER PIC X(17) VALUE | "07/01; 07/01; 182". |
| 10 | FILLER PIC X(17) VALUE | "07/02; 07/02; 183". |
| 10 | FILLER PIC X(17) VALUE | "07/03; 07/03; 184". |
| 10 | FILLER PIC X(17) VALUE | "07/04; 07/04; 185". |
| 10 | FILLER PIC X(17) VALUE | "07/05; 07/05; 186". |
| 10 | FILLER PIC X(17) VALUE | "07/06; 07/06; 187". |
| 10 | FILLER PIC X(17) VALUE | "07/07; 07/07; 188". |
| 10 | FILLER PIC X(17) VALUE | "07/08; 07/08; 189". |
| 10 | FILLER PIC X(17) VALUE | "07/09; 07/09; 190". |
| 10 | FILLER PIC X(17) VALUE | "07/10; 07/10; 191". |
| 10 | FILLER PIC X(17) VALUE | "07/11; 07/11; 192". |
| 10 | FILLER PIC X(17) VALUE | "07/12; 07/12; 193". |
| 10 | FILLER PIC X(17) VALUE | "07/13; 07/13; 194". |
| 10 | FILLER PIC X(17) VALUE | "07/14; 07/14; 195". |
| 10 | FILLER PIC X(17) VALUE | "07/15; 07/15; 196". |
| 10 | FILLER PIC X(17) VALUE | "07/16; 07/16; 197". |
| 10 | FILLER PIC X(17) VALUE | "07/17; 07/17; 198". |
| 10 | FILLER PIC X(17) VALUE | "07/18; 07/18; 199". |
| 10 | FILLER PIC X(17) VALUE | "07/19; 07/19; 200". |
| 10 | FILLER PIC X(17) VALUE | "07/20; 07/20; 201". |
| 10 | FILLER PIC X(17) VALUE | "07/21; 07/21; 202". |
| 10 | FILLER PIC X(17) VALUE | "07/22; 07/22; 203". |
| 10 | FILLER PIC X(17) VALUE | "07/23; 07/23; 204". |
| 10 | FILLER PIC X(17) VALUE | "07/24; 07/24; 205". |
| 10 | FILLER PIC X(17) VALUE | "07/25; 07/25; 206". |
| 10 | FILLER PIC X(17) VALUE | "07/26; 07/26; 207". |
| 10 | FILLER PIC X(17) VALUE | "07/27; 07/27; 208". |
| 10 | FILLER PIC X(17) VALUE | "07/28; 07/28; 209". |
| 10 | FILLER PIC X(17) VALUE | "07/29; 07/29; 210". |
| 10 | FILLER PIC X(17) VALUE | "07/30; 07/30; 211". |
| 10 | FILLER PIC X(17) VALUE | "07/31; 07/31; 212". |
| 10 | FILLER PIC X(17) VALUE | "08/01; 08/01; 213". |
| 10 | FILLER PIC X(17) VALUE | "08/02; 08/02; 214". |
| 10 | FILLER PIC X(17) VALUE | "08/03; 08/03; 215". |
| 10 | FILLER PIC X(17) VALUE | "08/04; 08/04; 216". |
| 10 | FILLER PIC X(17) VALUE | "08/05; 08/05; 217". |
| 10 | FILLER PIC X(17) VALUE | "08/06; 08/06; 218". |
| 10 | FILLER PIC X(17) VALUE | "08/07; 08/07; 219". |
| 10 | FILLER PIC X(17) VALUE | "08/08; 08/08; 220". |
| 10 | FILLER PIC X(17) VALUE | "08/09; 08/09; 221". |
| 10 | FILLER PIC X(17) VALUE | "08/10; 08/10; 222". |
| 10 | FILLER PIC X(17) VALUE | "08/11; 08/11; 223". |
| 10 | FILLER PIC X(17) VALUE | "08/12; 08/12; 224". |
| 10 | FILLER PIC X(17) VALUE | "08/13; 08/13; 225". |
| 10 | FILLER PIC X(17) VALUE | "08/14; 08/14; 226". |
| 10 | FILLER PIC X(17) VALUE | "08/15; 08/15; 227". |
| 10 | FILLER PIC X(17) VALUE | "08/16; 08/16; 228". |
| 10 | FILLER PIC X(17) VALUE | "08/17; 08/17; 229". |
| 10 | FILLER PIC X(17) VALUE | "08/18; 08/18; 230". |
| 10 | FILLER PIC X(17) VALUE | "08/19; 08/19; 231". |
| 10 | FILLER PIC X(17) VALUE | "08/20; 08/20; 232". |
| 10 | FILLER PIC X(17) VALUE | "08/21; 08/21; 233". |
| 10 | FILLER PIC X(17) VALUE | "08/22; 08/22; 234". |
| 10 | FILLER PIC X(17) VALUE | "08/23; 08/23; 235". |
| 10 | FILLER PIC X(17) VALUE | "08/24; 08/24; 236". |
| 10 | FILLER PIC X(17) VALUE | "08/25; 08/25; 237". |
| 10 | FILLER PIC X(17) VALUE | "08/26; 08/26; 238". |
| 10 | FILLER PIC X(17) VALUE | "08/27; 08/27; 239". |
| 10 | FILLER PIC X(17) VALUE | "08/28; 08/28; 240". |
| 10 | FILLER PIC X(17) VALUE | "08/29; 08/29; 241". |
| 10 | FILLER PIC X(17) VALUE | "08/30; 08/30; 242". |
| 10 | FILLER PIC X(17) VALUE | "08/31; 08/31; 243". |
| 10 | FILLER PIC X(17) VALUE | "09/01; 09/01; 244". |
| 10 | FILLER PIC X(17) VALUE | "09/02; 09/02; 245". |
| 10 | FILLER PIC X(17) VALUE | "09/03; 09/03; 246". |
| 10 | FILLER PIC X(17) VALUE | "09/04; 09/04; 247". |

TABLE A-continued

| | | |
|---|---|---|
| 10 FILLER PIC X(17) VALUE | "09/05; 09/05; 248". |
| 10 FILLER PIC X(17) VALUE | "09/06; 09/06; 249". |
| 10 FILLER PIC X(17) VALUE | "09/07; 09/07; 250". |
| 10 FILLER PIC X(17) VALUE | "09/08; 09/08; 251". |
| 10 FILLER PIC X(17) VALUE | "09/09; 09/09; 252". |
| 10 FILLER PIC X(17) VALUE | "09/10; 09/10; 253". |
| 10 FILLER PIC X(17) VALUE | "09/11; 09/11; 254". |
| 10 FILLER PIC X(17) VALUE | "09/12; 09/12; 255". |
| 10 FILLER PIC X(17) VALUE | "09/13; 09/13; 256". |
| 10 FILLER PIC X(17) VALUE | "09/14; 09/14; 257". |
| 10 FILLER PIC X(17) VALUE | "09/15; 09/15; 258". |
| 10 FILLER PIC X(17) VALUE | "09/16; 09/16; 259". |
| 10 FILLER PIC X(17) VALUE | "09/17; 09/17; 260". |
| 10 FILLER PIC X(17) VALUE | "09/18; 09/18; 261". |
| 10 FILLER PIC X(17) VALUE | "09/19; 09/19; 262". |
| 10 FILLER PIC X(17) VALUE | "09/20; 09/20; 263". |
| 10 FILLER PIC X(17) VALUE | "09/21; 09/21; 264". |
| 10 FILLER PIC X(17) VALUE | "09/22; 09/22; 265". |
| 10 FILLER PIC X(17) VALUE | "09/23; 09/23; 266". |
| 10 FILLER PIC X(17) VALUE | "09/24; 09/24; 267". |
| 10 FILLER PIC X(17) VALUE | "09/25; 09/25; 268". |
| 10 FILLER PIC X(17) VALUE | "09/26; 09/26; 269". |
| 10 FILLER PIC X(17) VALUE | "09/27; 09/27; 270". |
| 10 FILLER PIC X(17) VALUE | "09/28; 09/28; 271". |
| 10 FILLER PIC X(17) VALUE | "09/29; 09/29; 272". |
| 10 FILLER PIC X(17) VALUE | "09/30; 09/30; 273". |
| 10 FILLER PIC X(17) VALUE | "10/01; 10/01; 274". |
| 10 FILLER PIC X(17) VALUE | "10/02; 10/02; 275". |
| 10 FILLER PIC X(17) VALUE | "10/03; 10/03; 276". |
| 10 FILLER PIC X(17) VALUE | "10/04; 10/04; 277". |
| 10 FILLER PIC X(17) VALUE | "10/05; 10/05; 278". |
| 10 FILLER PIC X(17) VALUE | "10/06; 10/06; 279". |
| 10 FILLER PIC X(17) VALUE | "10/07; 10/07; 280". |
| 10 FILLER PIC X(17) VALUE | "10/08; 10/08; 281". |
| 10 FILLER PIC X(17) VALUE | "10/09; 10/09; 282". |
| 10 FILLER PIC X(17) VALUE | "10/10; 10/10; 283". |
| 10 FILLER PIC X(17) VALUE | "10/11; 10/11; 284". |
| 10 FILLER PIC X(17) VALUE | "10/12; 10/12; 285". |
| 10 FILLER PIC X(17) VALUE | "10/13; 10/13; 286". |
| 10 FILLER PIC X(17) VALUE | "10/14; 10/14; 287". |
| 10 FILLER PIC X(17) VALUE | "10/15; 10/15; 288". |
| 10 FILLER PIC X(17) VALUE | "10/16; 10/16; 289". |
| 10 FILLER PIC X(17) VALUE | "10/17; 10/17; 290". |
| 10 FILLER PIC X(17) VALUE | "10/18; 10/18; 291". |
| 10 FILLER PIC X(17) VALUE | "10/19; 10/19; 292". |
| 10 FILLER PIC X(17) VALUE | "10/20; 10/20; 293". |
| 10 FILLER PIC X(17) VALUE | "10/21; 10/21; 294". |
| 10 FILLER PIC X(17) VALUE | "10/22; 10/22; 295". |
| 10 FILLER PIC X(17) VALUE | "10/23; 10/23; 296". |
| 10 FILLER PIC X(17) VALUE | "10/24; 10/24; 297". |
| 10 FILLER PIC X(17) VALUE | "10/25; 10/25; 298". |
| 10 FILLER PIC X(17) VALUE | "10/26; 10/26; 299". |
| 10 FILLER PIC X(17) VALUE | "10/27; 10/27; 300". |
| 10 FILLER PIC X(17) VALUE | "10/28; 10/28; 301". |
| 10 FILLER PIC X(17) VALUE | "10/29; 10/29; 302". |
| 10 FILLER PIC X(17) VALUE | "10/30; 10/30; 303". |
| 10 FILLER PIC X(17) VALUE | "10/31; 10/31; 304". |
| 10 FILLER PIC X(17) VALUE | "11/01; 11/01; 305". |
| 10 FILLER PIC X(17) VALUE | "11/02; 11/02; 306". |
| 10 FILLER PIC X(17) VALUE | "11/03; 11/03; 307". |
| 10 FILLER PIC X(17) VALUE | "11104; 11/04; 308". |
| 10 FILLER PIC X(17) VALUE | "11/05; 11/05; 309". |
| 10 FILLER PIC X(17) VALUE | "11/06; 11/06; 310". |
| 10 FILLER PIC X(17) VALUE | "11/07; 11/07; 311". |
| 10 FILLER PIC X(17) VALUE | "11/08; 11/08; 312". |
| 10 FILLER PIC X(17) VALUE | "11/09; 11/09; 313". |
| 10 FILLER PIC X(17) VALUE | "11/10; 11/10; 314". |
| 10 FILLER PIC X(17) VALUE | "11/11; 11/11; 315". |
| 10 FILLER PIC X(17) VALUE | "11/12; 11/12; 316". |
| 10 FILLER PIC X(17) VALUE | "11/13; 11/13; 317". |
| 10 FILLER PIC X(17) VALUE | "11/14; 11/14; 318". |
| 10 FILLER PIC X(17) VALUE | "11/15; 11/15; 319". |
| 10 FILLER PIC X(17) VALUE | "11/16; 11/16; 320". |
| 10 FILLER PIC X(17) VALUE | "11/17; 11/17; 321". |
| 10 FILLER PIC X(17) VALUE | "11/18; 11/18; 322". |
| 10 FILLER PIC X(17) VALUE | "11/19; 11/19; 323". |
| 10 FILLER PIC X(17) VALUE | "11/20; 11/20; 324". |
| 10 FILLER PIC X(17) VALUE | "11/21; 11/21; 325". |
| 10 FILLER PIC X(17) VALUE | "11/22; 11/22; 326". |
| 10 FILLER PIC X(17) VALUE | "11/23; 11/23; 327". |
| 10 FILLER PIC X(17) VALUE | "11/24; 11/24; 328". |
| 10 FILLER PIC X(17) VALUE | "11/25; 11/25; 329". |
| 10 FILLER PIC X(17) VALUE | "11/26; 11/26; 330". |
| 10 FILLER PIC X(17) VALUE | "11/27; 11/27; 331". |
| 10 FILLER PIC X(17) VALUE | "11/28; 11/28; 332". |
| 10 FILLER PIC X(17) VALUE | "11/29; 11/29; 333". |
| 10 FILLER PIC X(17) VALUE | "11/30; 11/30; 334". |
| 10 FILLER PIC X(17) VALUE | "12/01; 12/01; 335". |
| 10 FILLER PIC X(17) VALUE | "12/02; 12/02; 336". |
| 10 FILLER PIC X(17) VALUE | "12/03; 12/03; 337". |
| 10 FILLER PIC X(17) VALUE | "12/04; 12/04; 338". |
| 10 FILLER PIC X(17) VALUE | "12/05; 12/05; 339". |
| 10 FILLER PIC X(17) VALUE | "12/06; 12/06; 340". |
| 10 FILLER PIC X(17) VALUE | "12/07; 12/07; 341". |
| 10 FILLER PIC X(17) VALUE | "12/08; 12/08; 342". |
| 10 FILLER PIC X(17) VALUE | "12/09; 12/09; 343". |
| 10 FILLER PIC X(17) VALUE | "12/10; 12/10; 344". |
| 10 FILLER PIC X(17) VALUE | "12/11; 12/11; 345". |
| 10 FILLER PIC X(17) VALUE | "12/12; 12/12; 346". |
| 10 FILLER PIC X(17) VALUE | "12/13; 12/13; 347". |
| 10 FILLER PIC X(17) VALUE | "12/14; 12/14; 348". |
| 10 FILLER PIC X(17) VALUE | "12/15; 12/15; 349". |
| 10 FILLER PIC X(17) VALUE | "12/16; 12/16; 350". |
| 10 FILLER PIC X(17) VALUE | "12/17; 12/17; 351". |
| 10 FILLER PIC X(17) VALUE | "12/18; 12/18; 352". |
| 10 FILLER PIC X(17) VALUE | "12/19; 12/19; 353". |
| 10 FILLER PIC X(17) VALUE | "12/20; 12/20; 354". |
| 10 FILLER PIC X(17) VALUE | "12/21; 12/21; 355". |
| 10 FILLER PIC X(17) VALUE | "12/22; 12/22; 356". |
| 10 FILLER PIC X(17) VALUE | "12/23; 12/23; 357". |
| 10 FILLER PIC X(17) VALUE | "12/24; 12/24; 358". |
| 10 FILLER PIC X(17) VALUE | "12/25; 12/25; 359". |
| 10 FILLER PIC X(17) VALUE | "12/26; 12/26; 360". |
| 10 FILLER PIC X(17) VALUE | "12/27; 12/27; 361". |
| 10 FILLER PIC X(17) VALUE | "12/28; 12/28; 362". |
| 10 FILLER PIC X(17) VALUE | "12/29; 12/29; 363". |
| 10 FILLER PIC X(17) VALUE | "12/30; 12/30; 364". |
| 10 FILLER PIC X(17) VALUE | "12/31; 12/31; 365". |
| 05 TRC-CAL-TO-KAL-TABLE-2-DEF REDEFINES | |
| TRC-CAL-TO-KAL-TABLE-1-DEF | |
| 10 FILLER OCCURS 367 TIMES | |
| INDEXED BY TRC-CAL-TO-KAL-IDX | |
| 15 TRC-CAL-TO-KAL-TBL-G-MO-LEAP | PIC9(02) |
| 15 FILLER | PICX(01) |
| 15 TRC-CAL-TO-KAL-TBL-G-DA-LEAP | PIC9(02) |
| 15 FILLER | PICX(01) |
| 15 TRC-CAL-TO-KAL-TBL-G-MO-N-LEAP | PIC9(02) |
| 15 FILLER | PICX(01) |
| 15 TRC-CAL-TO-KAL-TBL-G-DA-N-LEAP | PIC9(02) |
| 15 FILLER | PICX(03) |
| 15 TRC-CAL-TO-KAL-TBL-K360-DAY | PIC9(03) |

After the three hundred and sixty seven table entries of level 10, the next pair of COBOL computer code lines, which are at level 05, equate TRC-CAL-TO-KAL-TABLE-2-DEF to TRC-CAL-TO-KAL-TABLE-1-DEF to facilitate the breakdown of the seventeen characters in each row of the table into fields, as described below. The following line of COBOL computer code at level 10 confirms that the dummy name FILLER occurs three hundred and sixty seven times and assigns the index of the table the character name TRC-CAL-TO-KAL-IDX.

The following nine lines of COBOL computer code at level 15 assign variable names to the fields in the sixth column of the table entries. The first two characters in the table entry are numeric characters, as indicated by the code "PIC 9(02)" at the end of the line, and are assigned the variable name TRC-CAL-TO-KAL-TBL-G-MO-LEAP since these characters represent a Gregorian leap year month. The next character is an alphanumeric filler character, as indicated by the code "PIC X(01)." In the table a slash is used for this filler character. The values of the filler characters in the table do not affect the date conversion process, so characters other than those shown may be used. The next two characters in the table entry are numeric characters and are assigned the variable name TRC-CAL-TO-KAL-TBL-G-DA-LEAP since these characters represent a Gregorian leap year day-of-the-month. The variables TRC-CAL-TO-KAL-TBL-G-MO-LEAP and TRC-CAL-TO-KAL-TBL-G-DA-LEAP are considered to comprise the Gregorian leap year field of the table. The next character is another alphanumeric filler character - - - in the table a semi-colon is used for this filler character. The next two characters in the table entry are numeric characters and are assigned the variable name TRC-CAL-TO-KAL-TBL-G-MO-N-LEAP since these characters represent a Gregorian non-leap year month. The next character is another alphanumeric filler character - - - another slash is used for this filler character. The next two characters in the table entry are numeric characters and are assigned the variable name TRC-CAL-TO-KAL-TBL-G-DA-N-LEAP since these characters represent a Gregorian non-leap year day-of-the-month. The variables TRC-CAL-TO-KAL-TBL-G-MO-N-LEAP and TRC-CAL-TO-KAL-TBL-G-DA-N-LEAP are considered to comprise the Gregorian non-leap year field of the table. The next three characters are alphanumeric filler characters - - - a semicolon and two spaces are used for these filler characters. The next three characters in the table entry are numeric characters and are assigned the variable name TRC-CAL-TO-KAL-TBL-K360-DAY since these characters represent a 360-day-year day-of-the-year. The variable TRC-CAL-TO-KAL-TBL-K360-DAY is considered to comprise the 360-day-year field of the table. For convenience of discussion, the Gregorian leap year and non-leap year fields will be referred to as the sixth column, and the 360-day-year field will be referred to as the seventh column. Also for convenience of discussion, the Gregorian leap year field be referred to as the left-hand half of the sixth column, and the Gregorian non-leap year field will be referred to as the right-hand half of the sixth column.

The day-of-the-year 02/29 is listed in the left-hand half of the column, but not the right-hand half, since the left-hand day-of-the-year of the pair in the sixth column of TABLE A is for leap years. It may be noted that some days-of-the-year are repeated in both the left-hand and right-hand halves of the sixth column. In particular, 02/29 is repeated twice in the left-hand half, and 03/01 is repeated three times in the right-hand half. It may be noted that some numbers in the seventh column of the table of TABLE A (namely 030, 90, 210, 240, 300 and 360) are also repeated.

It should be noted that an important advantage of the system of the present invention is the economy of the table of TABLE A. According to the present invention four different types of calendar conversions (namely 360-day-year to Gregorian leap year, 360-day-year to Gregorian non-leap year, Gregorian leap year to 360-day-year, and Gregorian non-leap year to 360-day-year) are accomplished using a table with rows having only three fields.

Figure 2:
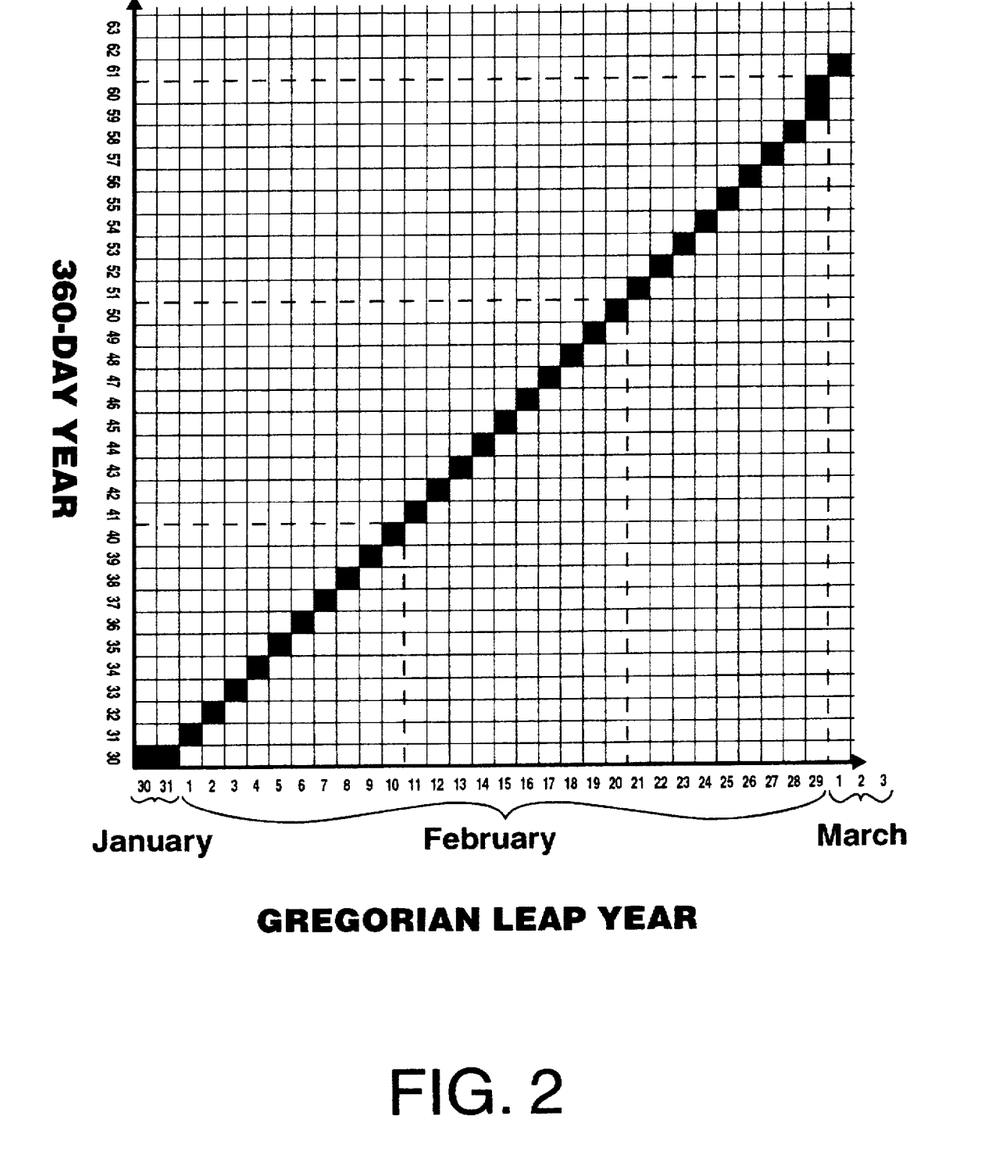
FIG. 2 provides a graphical representation of date conversion as shown in TABLE A for a leap year.

The mapping between the Gregorian leap year days-of-the-year in the left-hand half of the sixth column and the 360-day-year days-of-the-year in the seventh column of TABLE A is represented graphically in FIG. 2 for a period which includes all of February, the last two days of January, and the first day of March. Clearly, most of the points lie along a diagonal line with a slope of unity. There is a horizontal section of the graph at January 30 to January 31, and a vertical section of the graph with a length of two 360-day-year days at February 29. Inspection of the table of TABLE A shows that a graph of the entire year would have additional horizontal sections from March 30 to March 31, July 30 to July 31, August 30 to August 31, October 30 to October 31, and December 30 to December 31. However, the vertical section that occurs at the end of February is the only vertical section of a graph of the entire year.

Figure 3:
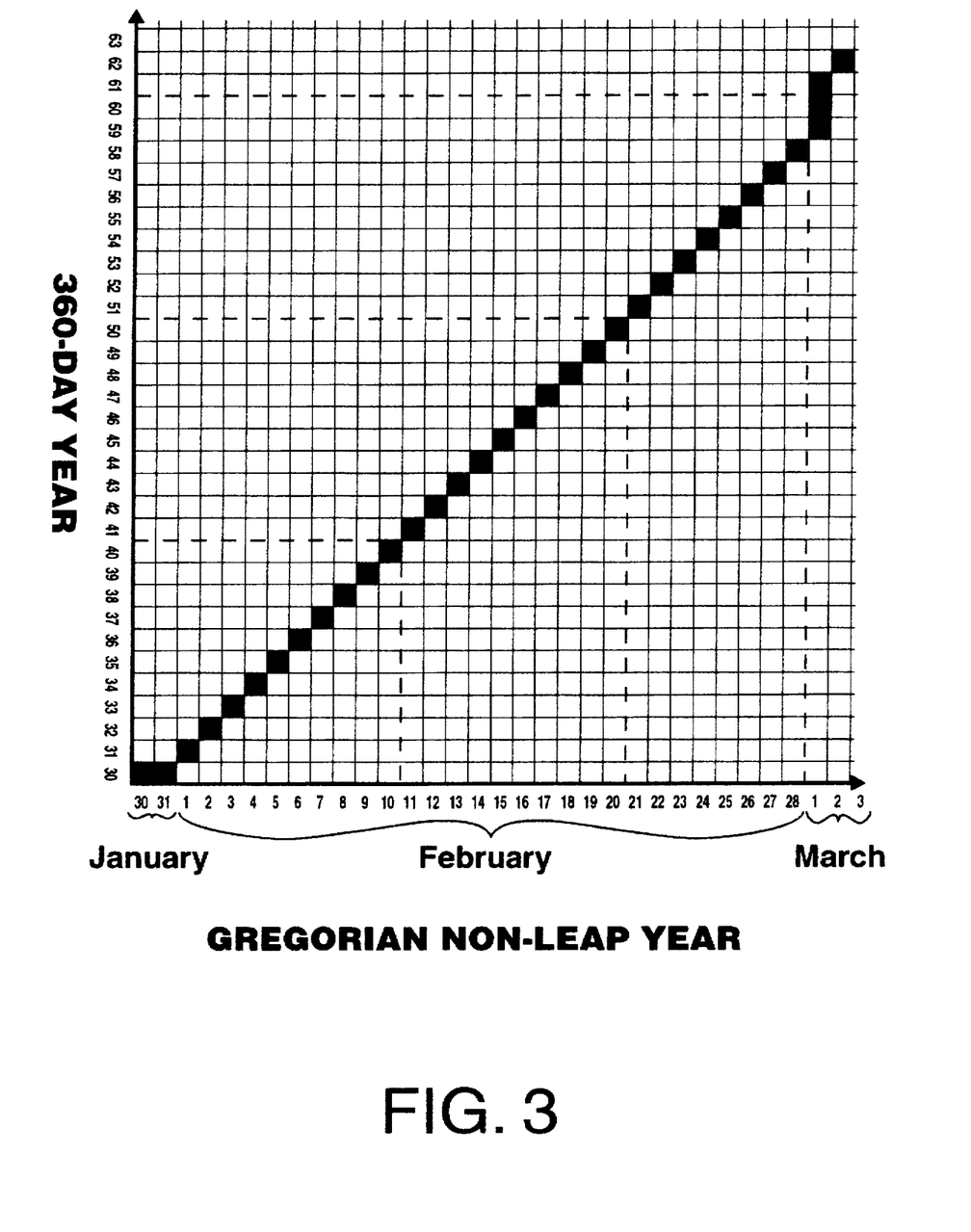
FIG. 3 provides a graphical representation of date conversion as shown in TABLE A for a non-leap year.

Similarly, the mapping between the Gregorian non-leap year days-of-the-year in the right-hand half of the sixth column and the 360-day-year days-of-the-year in the seventh column of TABLE A is represented graphically in FIG. 3 for a period which includes all of February, the last two days of January, and the first two days of March. Clearly, most of the points lie along a diagonal line with a slope of unity. There is a horizontal section of the graph at January 30 to January 31, and a vertical section of the graph with a length of three 360-day-year days at March 1. Inspection of the table of TABLE A shows that a graph of the entire year would have additional horizontal sections from March 30 to March 31, July 30 to July 31, August 30 to August 31, October 30 to October 31, and December 30 to December 31. However, the vertical section that occurs at the beginning of March is the only vertical section of a graph of the entire year.

It is important to note that no single function could generate a mapping such as that shown in FIGS. 2 or 3 since these graphs have both vertical and horizontal sections. A function of the abscissa could generate a graph with horizontal sections, or a function of the ordinate could generate a graph with vertical sections.

As discussed above, a conversion from a Gregorian day-of-the-year to a 360-day-year day-of-the-year is performed by searching upwards through the table of TABLE A for a match. For instance, the conversion of the Gregorian day-of-the-year 8/20 in a leap year to a 360-day-year day-of-the-year is performed by searching from upwards in the left-hand half of the sixth column from the day-of-the-year 12/31 in TABLE A. The entry "8/20" is reached in TABLE A, and the corresponding entry in the seventh column is "230," so 230 is the 360-day-year day-of-the-year corresponding to 8/20 in a leap year. Similarly, the conversion of the Gregorian day-of-the-year 8/20 in a non-leap year to a 360-day-year day-of-the-year is performed by searching from upwards in the right-hand half of column sixth from the day-of-the-year of 12/31 in TABLE A. The entry "8/20" is reached in TABLE A, and again the corresponding entry in the seventh column is "230," so 230 is also the 360-day-year day-of-the-year corresponding to 8/20 in a non-leap year.

The importance of searching from the last day-of-the-year at the bottom of the table of TABLE A toward the first day-of-the-year at the top of the table is illustrated by the conversion of the Gregorian day-of-the-year 2/29 in a leap year to a 360-day-year day-of-the-year. In searching upwards in the left-hand half of the sixth column from the day-of-the-year of 12/31 in TABLE A, a first entry "2/29" is reached when the corresponding entry in the seventh column is "60," so 60 is the 360-day-year day-of-the-year corresponding to 2/29 in a leap year. It should be noted that although there is a second "2/29" entry just above this one with a corresponding 360-day-year day-of-the-year of "59," this entry is not reached according to the logic of FIG. 1C since when a match is found 330–335 no further entries of the Date Conversion Table 160 are examined. Similarly, the conversion of the Gregorian day-of-the-year 3/01 in a non-leap year to a 360-day-year day-of-the-year, is performed by searching upwards in the right-hand half of the sixth column. When a first entry "3/01" is reached the corresponding entry in the seventh column is "61," so 61 is the 360-day-year day-of-the-year corresponding to 3/01 in a non-leap year. In this case it should be noted that although there are second and third "3/01" entries just above this one with corresponding 360-day-year days-of-the-year of "60," and "59," these entries are not reached according to the logic of FIG. 1C since when a match is found 330–335 no further entries of the Date Conversion Table 160 are examined.

As discussed above in conjunction with FIG. 1D, the same search method is used in conversions of 360-day-year days-of-the-year to Gregorian days-of-the-year. For instance, the conversion of the 360-day-year day-of-the-year "66" in a leap year to a Gregorian day-of-the-year is performed by searching from upwards in the seventh column from the entry of "360" in TABLE A. The entry "66" is reached in TABLE A, and the corresponding entry in the left-hand half of the sixth column is "3/06," so March 6 is the Gregorian day-of-the-year corresponding to the 360-day-year day-of-the-year of "66" in a leap year. Similarly, the conversion of the 360-day-year day-of-the-year "66" in a non-leap year is performed by searching from upwards in the seventh column until the entry "66" is reached in TABLE A. The corresponding entry in the right-hand half of the sixth column is again "3/06," so March 6 is the corresponding Gregorian day-of-the-year in a non-leap year.

The importance of searching from the last day-of-the-year at the bottom of the table of TABLE A toward the first day-of-the-year at the top of the table is illustrated by the conversion of the 360-day-year day-of-the-year "90" to a Gregorian leap year day-of-the-year. In searching upwards in the seventh column from the day-of-the-year of "360" in TABLE A, a first entry of "90" is reached when the corresponding entry in the left-hand half of the sixth column is "3/31," so March 31 is the Gregorian day-of-the-year corresponding to the 360-day-year day-of-the-year of "90" in a leap year. It should be noted that although there is a second "90" entry just above this one with a corresponding Gregorian day-of-the-year of March 30, this entry is not reached according to the logic of FIG. 1D since when a match is found 430–435 no further entries of the Date Conversion Table 160 are examined. Similarly, the conversion of the 360-day-year day-of-the-year "90" to a Gregorian non-leap year day-of-the-year is performed by searching upwards in the seventh column from the day-of-the-year of "360" in TABLE A. When a first entry of "90" is reached, the corresponding entry in the right-hand half of the sixth column is again "3/31," or March 31. Again it is noted that although there is a second "90" entry just above this one with a corresponding Gregorian day-of-the-year of March 30, this entry is not reached according to the logic of FIG. 1D.

For a graph such as that shown in FIGS. 2 and 3, but for the entire year, the graphical equivalent of the search from the last day-of-the-year to the first day-of-the-year in the table of TABLE A is a descent from the top right-hand point in the graph, downwards and to the left (each point on the graph has a neighboring point that is either directly to the left, or directly below, or directly diagonal to the bottom-left) until the appropriate Gregorian day-of-the-year or 360-day-year day-of-the-year is reached. For instance, the conversion of March 1 to a 360-day-year day-of-the-year in a non-leap year is begun at the point in the upper right-hand corner (corresponding to the 360-day-year day-of-the-year of 360, not shown in FIG. 3), and continues downwards and to the left until the point corresponding to the abscissa value of March 1 and the ordinate value of 61 is reached, as shown in FIG. 3. Therefore, the 61st day-of-the-year of the 360-day-year corresponds to March 1 of a non-leap year. It should be noted that although ordinate values of 60 and 59 also correspond to the abscissa value of March 1, these ordinate values are not reached according to the logic of FIG. 1C.

Similarly, the conversion of the 30th day-of-the-year of the 360-day-year in a leap year is begun at the point in the upper right-hand corner (corresponding to the 360-day-year day-of-the-year of 360, not shown in FIG. 2), and continues downwards and to the left until the point corresponding to the ordinate value of 30 and the abscissa value of January 31 is reached, as shown in FIG. 2. Therefore, the 30th day-of-the-year of the 360-day-year corresponds to January 31 of a leap year. It should be noted that although an abscissa value of January 30 also correspond to the ordinate value of 30, this ordinate value is not reached according to the logic of FIG. 1D since when a match is found 430–435 no further entries of the Date Conversion Table 160 are examined.

Although the above description contains many specificities, these should not be construed as limiting the scope of the invention, but as merely providing illustrations of some of the preferred embodiments of this invention. Many variations are possible and are to be considered within the scope of the present invention. For instance: the 360-day-year-to-Gregorian conversion apparatus and the Gregorian-to-360-day-year conversion apparatus may share the same Load Year, Test For Leap Year, Copy, or Set Found Flag units; the 360-day-year-to-Gregorian conversion apparatus and the Gregorian-to-360-day-year conversion apparatus may share the same Year Register, Leap Year Flag Buffer Register, Leap Year Flag Access Register, or Found Flag Register; the Binary 360-Day-Year Date Register may be adapted to also be used as the Binary Gregorian Date Register, or vice versa; the Translate to Character Format unit may be adapted to be used for both directions of date conversion; the 360-Day-Year Character Register may be adapted to also be used as the Month/Day Character Register, or vice versa; the 360-Day-Year Day-of-the-year Register may be adapted to also be used as the Gregorian Day-of-the-year Register, or vice versa; a single Search Table unit may be adapted for use in both the 360-day-year-to-Gregorian conversion apparatus and the Gregorian-to-360-day-year conversion; the apparatus need not include a Leap Year Flag Buffer Register and/or a Set Found Flag unit and a Found Flag Register, and may instead include other means for preventing the leap year flag from changing value during a date conversion; the day-of-the-year data in the Date Conversion Table may be stored in binary format, so the apparatus need not include means for translating a date from binary format to character format; the invention may be implemented using a data processing programming language other than COBOL; the Date Conversion Table may use other filler characters; the fields in the Date Conversion Table may be arranged in a different format; the correspondence between 360-day-year days-of-the-year and leap year and non-leap year Gregorian days-of-the-year in the Date Conversion Table may be different; other methods may be used to determine which years are leap years; rather than initializing the index at a value of 367, the index may be initialized at an approximated value which is guaranteed to be greater than the value of the index at which a match will be found; etc. Many other variations are also to be considered within the scope of the present invention. Thus the scope of the invention should be determined not by the examples given herein, but rather by the appended claims and their legal equivalents.

What is claimed is:

1. An apparatus for a conversion of a date from a first calendar to a second calendar, said date having a year and a first day-of-the-year according to said first calendar, and said date having said year and a second day-of-the-year according to said second calendar, comprising:

a first day-of-the-year storage register for storage of said first day-of-the-year;

a date conversion table having a plurality of rows, each of said rows having a first field containing a solar calendar leap year day-of-the-year, a second field containing a solar calendar non-leap year day-of-the-year, and a third field containing a 360-day-year day-of-the-year, said rows being ordered from a beginning row containing said first, second and third fields for a beginning day-of-the-year, to a last row containing said first, second and third fields for a last day-of-the-year;

a leap year flag access register for storage of a first leap year flag;

means for setting said first leap year flag to a "yes" value if said year is a leap year, and setting said first leap year flag to a "no" value if said year is not a leap year;

a second day-of-the-year storage register; and a search table unit including means for searching said date conversion table in a direction from said last row towards said beginning row,     means for comparing said first day-of-the-year to said first field if said first calendar is a solar calendar and said first leap year flag has said "yes" value, comparing said first day-of-the-year to said second field if said first calendar is said solar calendar and said first leap year flag has said "no" value, and comparing said first day-of-the-year to said third field if said first calendar is a 360-day-year calendar, until a match is found at a match row of said date conversion table, and     means for storing said first field of said match row in said second day-of-the-year storage register if said second calendar is said solar calendar and said first leap year flag has said "yes" value, storing said second field of said match row in said second day-of-the-year storage register if said second calendar is said solar calendar and said first leap year flag has said "no" value, and storing said third field of said match row in said second day-of-the-year storage register if said second calendar is said 360-day-year calendar.

2. The apparatus of claim 1 wherein said date conversion table has 367 rows.

3. The apparatus of claim 1 wherein said means for setting said leap year flag includes a leap year buffer flag register for storage of a second leap year flag, and a means for copying said second leap year flag in said leap year buffer flag register to said first leap year flag in said leap year flag access register.

4. The apparatus of claim 1 wherein said first, second and third fields of said date conversion table have entries which are non-decreasing from said beginning row to said last row.

5. The apparatus of claim 1 wherein entries in said first, second and third fields of said date conversion table are stored in a character format so that said entries may be easily inspected.

6. The apparatus of claim 5 further including:

a third day-of-the-year storage register; and a means for converting said first day-of-the-year stored in said third day-of-the-year storage register from a binary format to said character format and storing said first day-of-the-year in said character format in said first day-of-the-year storage register.

7. The apparatus of claim 1 wherein said solar calendar is a Gregorian calendar, said solar calendar leap year day-of-the-year is a Gregorian leap year day-of-the-year, and said solar calendar non-leap year day-of-the-year is a Gregorian non-leap year day-of-the-year.

8. The apparatus of claim 1 wherein said solar calendar is a Julian calendar, said solar calendar leap year day-of-the-year is a Julian leap year day-of-the-year, and said solar calendar non-leap year day-of-the-year is a Julian non-leap year day-of-the-year.

\* \* \* \* \*